June 20, 1967 D. J. MAUCHEL 3,327,224

APPARATUS FOR PRODUCING TIME SCALE MARKINGS ON MAGNETIC RECORDS

Filed Nov. 29, 1962 2 Sheets-Sheet 1

INVENTOR
DEREK J. MAUCHEL
BY Larson and Taylor
ATTORNEYS

APPARATUS FOR PRODUCING TIME SCALE MARKINGS ON MAGNETIC RECORDS

Filed Nov. 29, 1962 2 Sheets-Sheet 2

INVENTOR
DEREK J. MAUCHEL

BY Larson and Taylor

ATTORNEYS 3,327,224

APPARATUS FOR PRODUCING TIME SCALE MARKINGS ON MAGNETIC RECORDS

Derek John Mauchel, Horsham, England, assignor to Communications Patents Limited, London, England Filed Nov. 29, 1962, Ser. No. 240,969
Claims priority, application Great Britain, Dec. 6, 1961, 43,708/61
4 Claims. (Cl. 328—41)

This invention relates to apparatus for producing time scale markings on a magnetic recording medium.

It is known to employ magnetic recording apparatus to record and more measured performance data, ambient conditions during measurement and the like. Time scale markings are sometimes included in such recordings to enable the data and conditions to be related to the time of measurement.

One indication of time may be provided on the record by recording digital signals derived from a shaft digitizer, the shaft of the digitizer being coupled to the driving mechanism of the recorder. The speed of the recorder is then accurately controlled to maintain, to a pre-determined value, the unit interval of time represented by one digit. This method of time recording necessitates the use of an elaborate digitizer and is costly.

It is an object of the present invention to provide improved means for producing time scale markings on a magnetic recording medium, such as magnetic tape or magnetic wire.

It is a further object of the invention to provide on a magnetic record, time scale markings in which, for example, minute and hour intervals are indicated.

According to the present invention, apparatus for producing time scale marks on a magnetic recording medium comprises a source of equally spaced electrical time signals, a plurality of bistable electrical units connected in cascade so that together they constitute a signal counting device of which each binary unit provides an output indication of the sense of one digit of a binary number which is a count of the number of time signals fed into the device, means for repeatedly sampling in sequence the outputs of at least some of the binary units to provide digits of the binary number, and recording head means arranged to record on the magnetic recording medium a signal denoting a binary number indication of the time elapse since a pre-determined reference time.

According to a further aspect of the invention, apparatus for providing time marks on a magnetic tape or magnetic wire, as described in the previous paragraph, includes a time signal counter having a group of binary units counting to a scale of "15" followed by a group of binary units counting to a scale of "4" for providing output timing indications at least at every 60th of the equally-spaced time signals.

Figure 1:
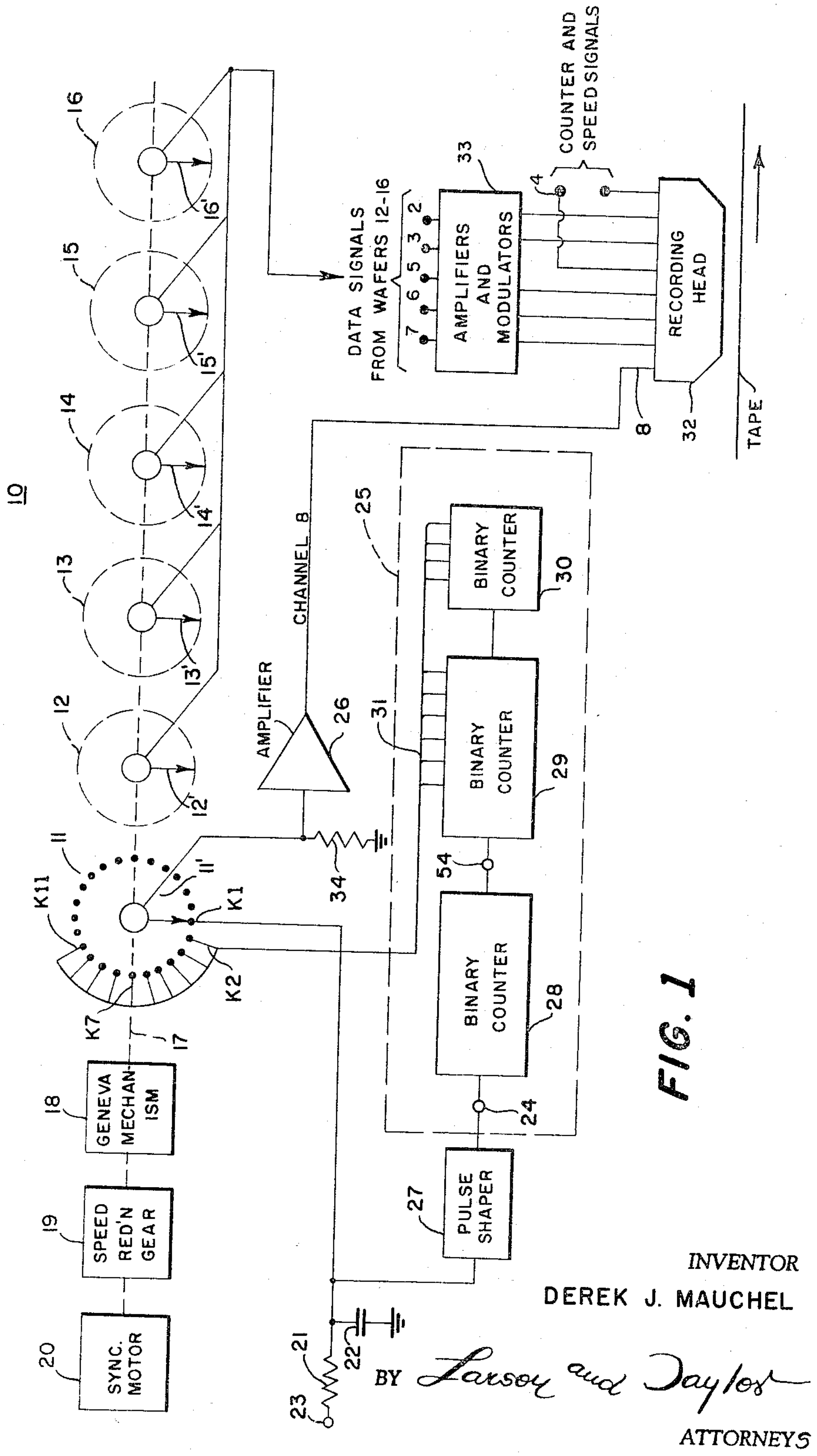
Figure 2:
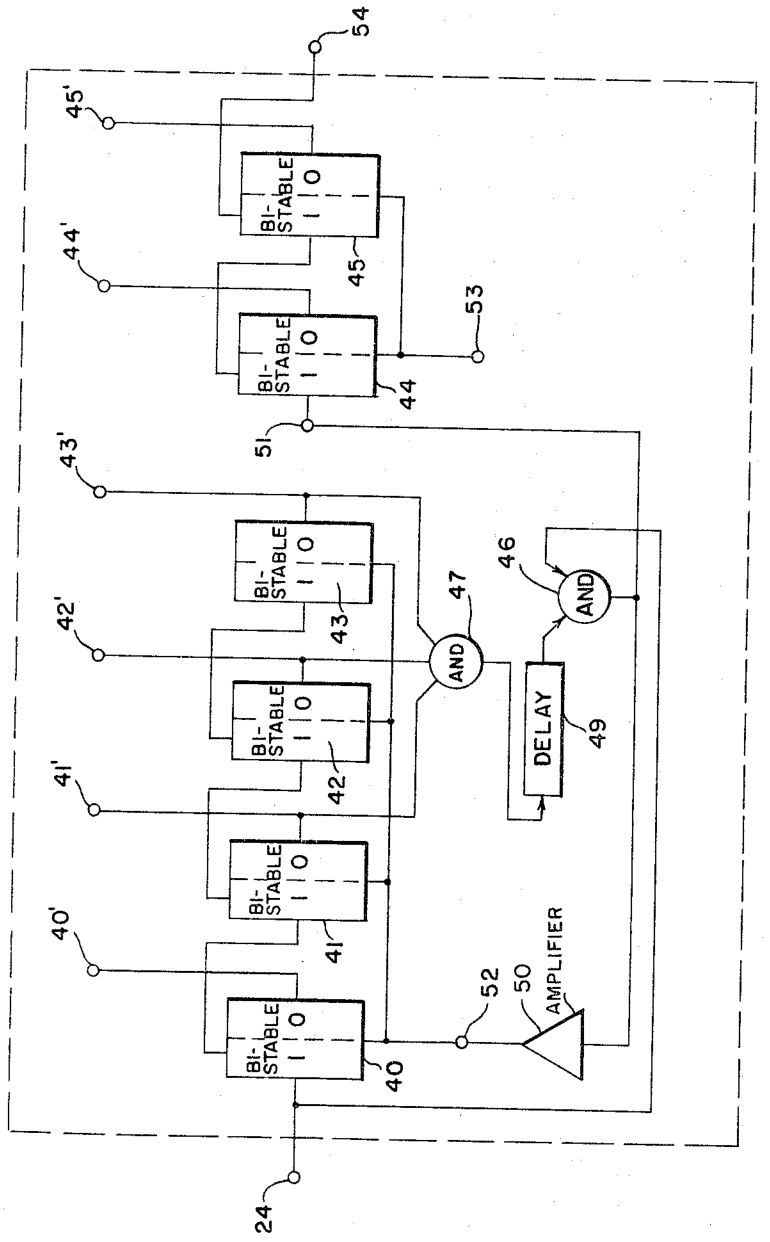

In order that the invention may be readily carried out, an embodiment thereof will now be described in detail, by way of example, with reference to the accompanying drawings, in which:

FIG. 1 is a schematic diagram of an apparatus for supplying time signals to recording circuits of an airborne magnetic tape recorder, and FIG. 2 is a schematic diagram of a binary counting unit used in the apparatus.

In the embodiment to be described with reference to FIG. 1, a magnetic tape is used as the magnetic recording medium in an aircraft data recorder. Such a recorder is intended for installation in an aircraft to provide, after recovery of the recorder in the event of an accident to the aircraft, a preserved record of the state of the aircraft, of communications between members of the crew and of communications between the aircraft and outside sources of information, for a significant period immediately prior to the accident.

To this end, data, including time marks, speech signals and tape speed control signals, are continuously recorded on, and after an interval continuously erased from, an endless loop of tape, using eight recording tracks simultaneously. One of the eight tracks is used for recording time marks, two tracks are used for recording speech signals and control signals and five tracks are used for recording the required data.

The tape loop is of such length, in relation to its speed of motion, as to be capable of storing the recorded time, speech, control and data signals for a period of 15 minutes. As elements of recorded data approach the recording head of the recorder, they are automatically erased and replaced by new elements of data recorded later by the recording head. In the event of an accident to the aircraft, recording automatically stops, so that a record of data during the preceding 15-minute period is preserved.

The data are obtained from several sources in the aircraft and, in order that sufficient data may be stored on the limited number of tracks available on the tape, a time division multiplex system is used. This system includes a high-speed, rotary, multiple channel sampling switch.

In FIG. 1, switch wafers 11 to 16 of a sampling switch 10, have their rotary wipers coupled to a driving shaft 17. Each switch wafer is provided with 24 contacts, the contacts of wafer 11 only being shown in the diagram. The contacts of wafer 11 are connected to a signal counting device, and the contacts of wafers 12 to 16 are connected to circuits and apparatus associated with the flight, engine and navigation systems of the aircraft, to obtain data therefrom. Wiper 11' of the wafer 11 is connected to the input of an amplifier 26, from which signals for providing the time marks are fed to channel 8 of an eight track recording head 32. Wipers 12' to 16' of the wafers 12 to 16 respectively are connected to amplifiers and modulators 33, used to feed data channels 2, 3, 5, 6 and 7 of the recording head. The speech and control signals are fed to channels 1 and 4 of the recording head.

The shaft 17 is coupled, by way of a "Geneva cross" intermittent movement 18 and a speed reduction gear 19, to the output shaft of a synchronous motor 20. The motor 20 is supplied with alternating current, the frequency of which is controlled to maintain the shaft speed constant to an accuracy of ±0.01%. The ratio of the speed reduction gear 19 is such that the speed of rotation of the shaft 17 is one revolution per second. The "Geneva cross" movement 18 provides intermittent movement of the shaft 17, to allow the wipers of the wafers to dwell on each contact for a short period of time and thus make more effective contact therewith.

Eleven contacts, K1 to K11, on the wafer 11 are used to provide the record marks on the magnetic tape. Contact K1 is connected to a resistor 21 and capacitor 22 and to an input terminal 24 of a signal counting device, indicated by the broken outline 25, via a pulse shaping unit 27. The capacitor 22 is charged continuously, via resistor 21, from a source of potential connected to terminal 23 and is discharged once every revolution of the switch 10 by a resistor 34, when contact K1 is connected by the wiper 11' to the input of the amplifier 26. Voltage changes therefore occur across the capacitor 22 which have the form of a series of pulses. Since the switch is rotated at a speed of one revolution per second, by the synchronous motor 20, these timing pulses occur at exactly timed intervals of one second. The pulses are fed to the amplifier 26 and to the input terminal 24 of the signal counting device, via the pulse shaping unit 27.

The signal counting device 25 comprises three binary counting units 28, 29 and 30 connected in cascade.

In the pulse shaping unit 27, which is of conventional design, the waveform of the pulses produced by charging and discharging the capacitor 22 is modified by limiting action, using diodes, to approximately rectangular form. The resulting rectangular pulses are applied to input terminal 24 of the counting unit 28.

In the unit 28, which is described in greater detail later in the specification, bistable units and gates are combined to count to a scale of "15" and to provide a pulse from the output of the unit corresponding to each 60th pulse of the series of one-second pulses fed to the input. Thus, the output pulses provided by the unit 28 occur at intervals of one minute.

These one-minute pulses are fed to the input of counting unit 29. This unit is similar to unit 28 and provides a pulse from the output of the unit corresponding to each 60th pulse of the series of one-minute pulses fed to the input. Thus, the output pulses provided by the unit 29 occur at intervals of one hour.

The bistable units of the unit 29 are connected in cascade, in two groups. A four-bit binary number is generated by four bistable units of the first group and a two-bit binary number is generated by the two bistable units of the second group.

The input of the first group of bistable units is fed, at intervals of one minute, with pulses from unit 28. Starting with all four bistable units set to zero, binary numbers are generated by the group, corresponding to whole numbers from "1" to "14," as the one-minute pulses are counted. The four bistable units are re-set to zero on receipt of every 15th one-minute pulse.

The input of the second group of bistable units is fed with a pulse when the bistable units of the first group are re-set to zero. Starting with the two elements of the group set to zero, binary numbers are generated by the group, corresponding to the numbers "15," "30" and "45," as the 15-minute pulses are counted. The bistable units of the group are re-set to zero on receipt of every 4th pulse, that is to say, at hourly intervals as every 60th pulse is fed to unit 29.

The unit 30 is fed with a pulse when the bistable units of the second group of units are re-set to zero. In the unit 30, which is described in greater detail later in the specification, four bistable units are used to generate binary numbers, corresponding to whole numbers from "1" to "15," as the one-hour pulses are counted.

Signals corresponding to the condition of six of the bistable units of the counting unit 29 are fed respectively to contacts K2 to K7 of the wafer 11, via conductors of a multi-way cable 31. The connections are such that the order of the digits of the binary numbers, corresponding to the condition of the bistable units, increases with the direction of rotation of the switch.

Signals corresponding to the condition of the four bistable units of the counting unit 30 are fed respectively to contacts K8 to K11 of the wafer 11, via conductors of the multi-way cable 31. The connections are such that the order of the digits of the binary number, corresponding to the condition of the four bistable units, increases with the direction of rotation of the switch.

Taken together, the signals applied to the contacts of the wafer 11 represent three binary numbers. The magnitude of the numbers is a count of the number of time signals fed into the device.

Using a modified form of 10-bit binary number, it is thus possible to indicate time uniquely over a period of 16 hours. Time marks at intervals of one second are provided and with these marks other marks to establish a unique indication of the minutes and hours which have elapsed since the device was put into operation. Each complete time mark will indicate the number of minutes which have elapsed in each quarter hour, the number of minutes corresponding to the number of quarter hours which have elapsed, and the number of hours which have elapsed, at the time the particular mark was made.

As previously stated, the outputs of ten bistable elements corresponding to ten binary digits are applied, in increasing order, to successive contacts of the wafer 11. During each revolution of the switch, which is once every second, the wiper 11' passes the contact K1. After amplification, a series of signals indicative of the time is then applied to channel 8 of the recording head of the recorder to provide the desired time mark.

When the magnetic tape is retrieved, after an accident to the aircraft, the recorded data are reproduced in a translation equipment which includes a binary-to-time converter, to provide from the time marks, an indication of elapsed time. In the translation equipment, chart-type pen recorders may be used to provide a visible and permanent record of each item of monitored aircraft data.

The binary counting unit 28 of FIG. 1 will now be described in greater detail with respect to FIG. 2. In this unit, transistors and crystal diodes are used as circuit elements, in conventional circuit arrangements, to provide gates and bistable counting units in a digital computing system.

Logic is performed by diode gates which operate with a finite voltage at the "1" state and zero voltage at the "0" state. Counting is performed by bistable units, so connected that a change of state occurs every time an increasing voltage step is applied to them. The output is a square wave, the falling edge of which is caused by the first input pulse and the rising edge of which is caused by the second input pulse. Thus, a rising edge is provided for each two input pulses and, by connecting the output of one bistable unit to the input of a second, a further division by two may thus be effected. The bistable units are connected to one another in series to make a divider of the desired order. A second output wave, of opposite polarity, is also produced by the bistable units. This pulse serves to operate the diode gates and to provide an indication of the state of the unit concerned. Power supply lines are omitted from the diagram for the sake of clarity.

A first group of four bistable units 40, 41, 42 and 43 and a second group of two bistable units 44 and 45 have the four units of the first group and the two units of the second group connected in series to divide by "15" and by "4" respectively.

The input pulses, derived from the resistor and capacitor network 21, 22, are applied by way of input terminal 24, to the input of bistable unit 40 and to a first input of an "and" gate 46.

The second outputs of units 41, 42 and 43 are applied to three inputs of an "and" gate 47. The gate 47 opens when the units 41, 42 and 43 indicate "1," that is to say, when fourteen pulses have been fed to terminal 24 and the indication provided at terminals 40', 41', 42' and 43' is "0111" respectively.

When the gate 47 opens, a signal is passed, via a delay unit 49, to a second input of the "and" gate 46.

In the unit 49, a delay is introduced, so that the signal applied to the second input of the gate 46 coincides with the 15th pulse of the series of pulses applied to terminal 24 and to the first input of the gate 46. When this occurs, the gate 46 opens and the 15th pulse is passed to an input terminal 51 of the second group of bistable units and to an amplifier unit 50. The output of the amplifier 50 is fed to the bistable units 40 to 43, via terminal 52, to reset the units to the "0" state.

The pulses applied to terminal 51 are counted by the second group of bistable units 44 and 45 in a manner similar to that of the first group of units.

The 1st, 2nd, 3rd and 4th pulses of the series of pulses applied to terminal 51 are counted and an indication "10," "01," "11" or "00," corresponding to the number of pulses counted, is provided at terminals 44' and 45'. On receipt of each 4th input pulse, an output pulse is passed to output terminal 54.

Thus, each 60th pulse of the series of one-second pulses fed to input terminal 24 is passed to the output terminal 54 to provide pulses, at one-minute intervals, to the input of counter unit 29.

As stated previously, the unit 29 is similar in all respects to the unit 28. The one-minute pulses are fed to the input of unit 29 and signals, representing the state of the six bistable units, are fed from terminals corresponding to the six terminals 40′ to 45′ to the contacts of the switch wafer 11. These signals represent the number of minutes which have elapsed in each quarter hour and the number of minutes corresponding to the number of quarter hours which have elapsed, from the time the recorder was brought into operation.

Each 60th pulse of the series of one-minute pulses fed to the input of unit 29 is passed to the output of the unit, to provide pulses at one-hour intervals to the input of the unit 30.

The unit 30 has four bistable units connected in cascade in a manner to count the hour-pulses applied to the input of the unit. The one-hour pulses generated by the unit 29 are counted and signals representing the state of the four bistable units are fed to further contacts of the switch wafer 11. These signals represent the number of hours which have elapsed from the time the recorder was brought into operation.

The bistable units are re-set to zero by a pulse signal, provided by switching means, which operates when the recorder is brought into operation at the commencement of a flight. The re-set pulse is also applied to the bistable units of the counting unit 28 by way of terminals 52 and 53 and to the corresponding terminals of counting unit 29.

In the embodiment described, the time marks are provided on a magnetic tape from which information is continuously erased. The invention is not limited to this embodiment and is applicable generally to the provision of time marks on a magnetic recording medium, of whatever form is convenient and whether the recorded data is continuously erased after an interval or not.

In applications of the invention other than to airborne recorders, the period of recording may extend over days and change of data at such closely spaced intervals as one second may be without interest. In such apparatus, hour-pulses may be supplied to a counting unit operating to a scale of "24," so as to produce an indication of elapsed time in days.

What I claim is:

1. Apparatus for producing time scale marks on a magnetic recording medium comprising means for generating equally spaced electrical time signals, signal counting means connected to said signal generating means comprising a plurality of bi-stable electrical units connected in cascade, each said bi-stable unit providing an output in binary form and the output of a group of bi-stable units being representative of a predetermined time interval, means for sequentially and repeatedly sampling the outputs of said bi-stable units, whereby the output of said bi-stable units from said sampling means may be recorded by a recording means, said signal counting means comprising a first group of bi-stable units counting to a scale of 15 and a following second group of bi-stable units counting to a scale of 4, said first group comprising four bi-stable units connected in cascade, said second group comprising two bi-stable units connected in cascade, each bi-stable unit having a terminal for providing a signal indicating its set state and a coincidence gate having three input terminals respectively connected to the said terminals of the second, third and fourth bi-stable units of the first group, said coincidence gate opening only when the said second, third and fourth units are in the same set state, said gate having an output connected to the input of the second group of bi-stable units.

2. The apparatus of claim 1, a delay line connected to the output of said gate and in turn connected to one input of a two-input "and" gate, said delay line having a delay time equal to the interval between successive time signals, and means for applying to the other input of said "and" gate signals supplied to the first bi-stable unit of said first group.

3. Apparatus for producing time scale marks on a magnetic recording medium comprising means for generating equally spaced electrical time signals, signal counting means connected to said signal generating means comprising a plurality of bi-stable electrical units connected in cascade, each said bi-stable unit providing an output in binary form and the output of a group of bi-stable units being representative of a predetermined time interval, means for sequentially and repeatedly sampling the outputs of said bi-stable units, whereby the output of said bi-stable units from said sampling means may be recorded by a recording means, said signal counting means comprising a first plurality of bi-stable units connected in cascade, and a following second group comprising a second plurality of bi-stable units connected in cascade, each bi-stable unit having a terminal for providing a signal indicating its set state and including a coincidence gate having input terminals respectively connected to the said terminal of the second, and subsequent bistable units of the first group, said coincidence gate opening only when the said second and subsequent units of the first group are in the same set state, said gate having an output connected to the input of the second group of bi-stable units.

4. The apparatus of claim 3, a delay line connected to the output of said gate and in turn connected to one input of a two-input "and" gate, said delay line having a delay time equal to the interval between successive time signals, and means for applying to the other input of said "and" gate signals supplied to the first bi-stable unit of said first group.

References Cited

UNITED STATES PATENTS

| | | | |
|---|---|---|---|
| 2,864,078 | 12/1958 | Seader | 340—174.1 |
| 2,932,547 | 4/1960 | Swan | 346—23 |
| 2,970,226 | 1/1961 | Skelton et al. | 307—88.5 |
| 3,044,042 | 7/1962 | Erath et al. | 346—23 |
| 3,093,815 | 6/1963 | Karnaugh | 340—173 |

ARTHUR GAUSS, *Primary Examiner.*

S. SRAGOW, *Examiner.*

F. C. WEISS, S. D. MILLER, *Assistant Examiners.*